the text on the following pages will provide a full description of the preferred embodiments.

(12) United States Patent
Lee et al.

(10) Patent No.: US 7,111,586 B2
(45) Date of Patent: Sep. 26, 2006

(54) INTENSITY VARIATION DEVICE FOR TRAINING ANIMALS

(75) Inventors: Thomas Brandon Lee, Seymour, TN (US); Rungwit Sangsingkeow, Knoxville, TN (US)

(73) Assignee: Radio Systems Corporation, Knoxville, TN (US)

( * ) Notice: Subject to any disclaimer, the term of this patent is extended or adjusted under 35 U.S.C. 154(b) by 6 days.

(21) Appl. No.: 10/817,602

(22) Filed: Apr. 2, 2004

(65) Prior Publication Data

US 2005/0217606 A1 Oct. 6, 2005

(51) Int. Cl.
*A01K 15/02* (2006.01)

(52) U.S. Cl. ................... 119/719; 119/720; 119/908; 340/573.3

(58) Field of Classification Search ........ 119/719, 119/720, 721, 908, 905; 340/573.1, 573.3; 367/139
See application file for complete search history.

(56) References Cited

U.S. PATENT DOCUMENTS

| 4,802,482 A | 2/1989 | Gonda et al. |
| 5,054,428 A | 10/1991 | Farkus |
| 5,465,687 A | 11/1995 | Custer |
| 5,666,908 A | 9/1997 | So |
| 5,815,077 A * | 9/1998 | Christiansen ............ 340/573.3 |
| 6,047,664 A | 4/2000 | Lyerly |
| 6,170,439 B1 | 1/2001 | Duncan et al. |
| 6,474,269 B1 | 11/2002 | So |
| 6,598,563 B1 * | 7/2003 | Kim et al. .................. 119/720 |
| 6,637,376 B1 | 10/2003 | Lee et al. |

* cited by examiner

*Primary Examiner*—Teri Pham Luu
*Assistant Examiner*—Kimberly S. Smith
(74) *Attorney, Agent, or Firm*—Pitts & Brittian, PC

(57) ABSTRACT

An apparatus for an animal training device including audible and electrical stimulation. A transmitting unit provides control signals to a receiving unit, which includes a receiver, a processor, and a switch connected to a transformer and electrodes. The processor provides signals that result in varying voltages that produce electrical pulses of varying voltage levels, which are applied at the electrodes and provide electrical stimulation of an animal for training.

6 Claims, 5 Drawing Sheets

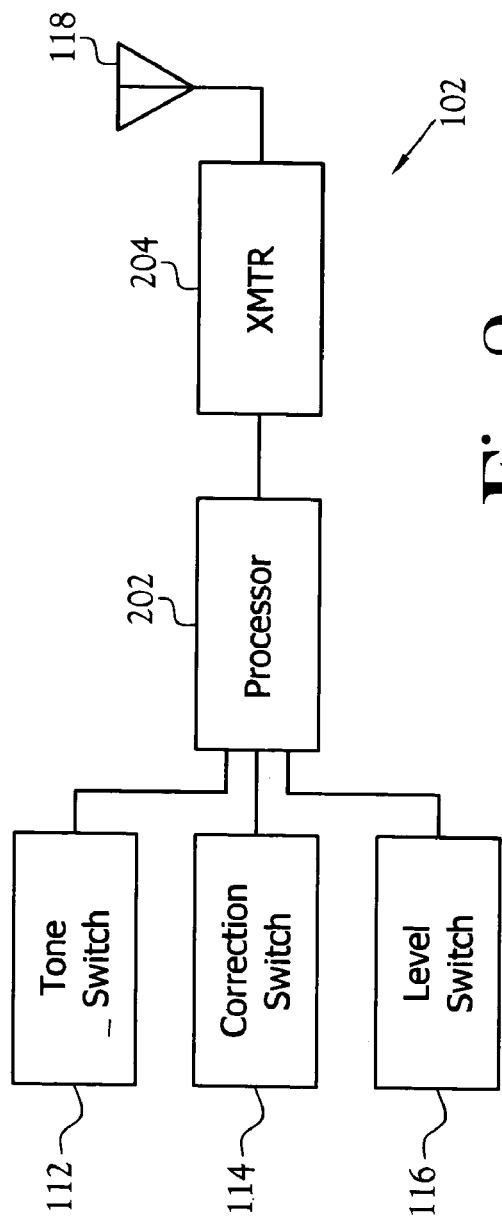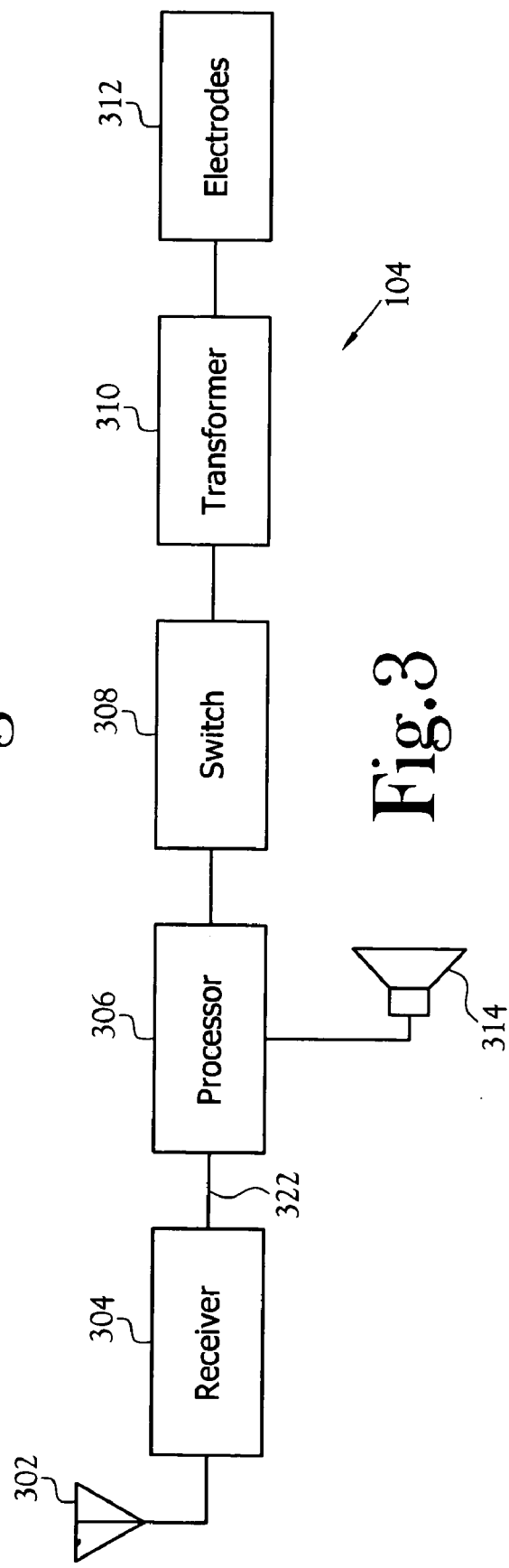

INTENSITY VARIATION DEVICE FOR TRAINING ANIMALS

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention pertains to an apparatus for varying the intensity of stimulation applied during animal training. More particularly, this invention pertains to varying the intensity of stimulation applied to an animal wearing a collar having an attached receiver. The intensity is varied by controlling the voltage applied to a switching device that produces the shock pulses that provide the stimulation to the animal.

2. Description of the Related Art

Radio controlled training collars are known for conditioning the behavior of an animal. A transmitter, commonly handheld, is controlled by a trainer. The collar is worn by an animal and includes a receiver that triggers an electrical circuit that applies electrical stimulation to the animal through electrodes in contact with the animal. To train the animal, the electrical stimulation must be sufficient to gain the animal's attention without injuring the animal. Further, some training protocols requires that the animal receive different stimulation based upon the animal's behavior.

Various methods are known for varying the stimulation applied to an animal through a training collar. For example, U.S. Pat. No. 5,666,908, titled "Animal Training Device," issued to So on Sep. 16, 1997, discloses an animal training device that applies different levels of electrical stimulation to an animal by varying a pulse width. The electrical stimulation is generated by applying a series of pulses to a switch connected to a transformer, which has its secondary windings connected to electrodes that contact the animal. The pulses have a constant voltage level at a fixed frequency; however, the pulse widths vary based on the desired stimulation to be applied. The transformer secondary voltage is directly related to the pulse width, accordingly, the electrical stimulation applied to the animal varies as the voltage varies. The lowest level of stimulation is produced with narrow pulse widths resulting in a lower voltage of electrical stimulation applied to the animal. The highest level of stimulation is produced with wide pulse widths resulting in higher voltage of electrical stimulation.

Another example is the device disclosed in U.S. Pat. No. 4,802,482, titled "Method and Apparatus for Remote Control of Animal Training Stimulus," issued to Gonda, et al., on Feb. 7, 1989. The Gonda device uses trains of pulses applied to the switch connected to the transformer. The Gonda device varies the stimulation intensity by varying the frequency of the pulses in the pulse train. The pulse train includes pulses having a fixed voltage and pulse width; however, the period between pulses is variable. The electrical stimulation applied to the animal is at a fixed voltage. The level of stimulation varies with the number of electrical stimulation signals applied to the animal per second. The lowest level of stimulation is produced by a pulse train with a low pulse frequency resulting in fewer electrical stimulation shocks per second. The highest level of stimulation is produced by a pulse train having a high pulse frequency resulting in more electrical stimulation shocks per second. The duration of the stimulation to the animal is controlled by the operator of the Gonda device.

A still another example is the device disclosed in U.S. Pat. No. 5,054,428, titled "Method and Apparatus for Remote Conditioned Cue Control of Animal Training Stimulus," issued to Farkus on Oct. 8, 1991. The Farkus device varies the stimulation intensity applied to the animal by varying the length of the pulse train applied to the switch connected to the transformer. The pulse train includes pulses having a fixed voltage and pulse width, and the pulses have a fixed frequency. The electrical stimulation applied to the animal is at a fixed voltage. The level of stimulation varies with the duration of the stimulation to the animal. The lowest level of stimulation is produced with a pulse train having a single pulse and a short duration. The highest level of stimulation is produced by a pulse train that includes approximately 64 pulses, which results in a longer duration stimulation being applied to the animal.

BRIEF SUMMARY OF THE INVENTION

According to one embodiment of the present invention, an animal training device is provided. The device includes a transmitter unit and a receiver unit, which is attached to a collar. The device provides a stimulus to an animal based on the actions of a trainer. The stimulus is either audible, such as a beep, or electrical, such as a shock applied to an external area of the animal. The electrical stimulation has variable levels determined by the voltage applied to a switch connected to a transformer, which is connected to electrodes.

BRIEF DESCRIPTION OF THE SEVERAL VIEWS OF THE DRAWINGS

The above-mentioned features of the invention will become more clearly understood from the following detailed description of the invention read together with the drawings in which:

FIG. 2 is a block diagram of one embodiment of the transmitter unit;

FIG. 3 is a block diagram of one embodiment of the receiver unit;

DETAILED DESCRIPTION OF THE INVENTION

An apparatus for an animal training device is disclosed. The device is shown generally as 10 on the drawings. The apparatus provides stimulation, either audible or electrical, to the animal to promote or discourage specific behavior of the animal.

Figure 1:
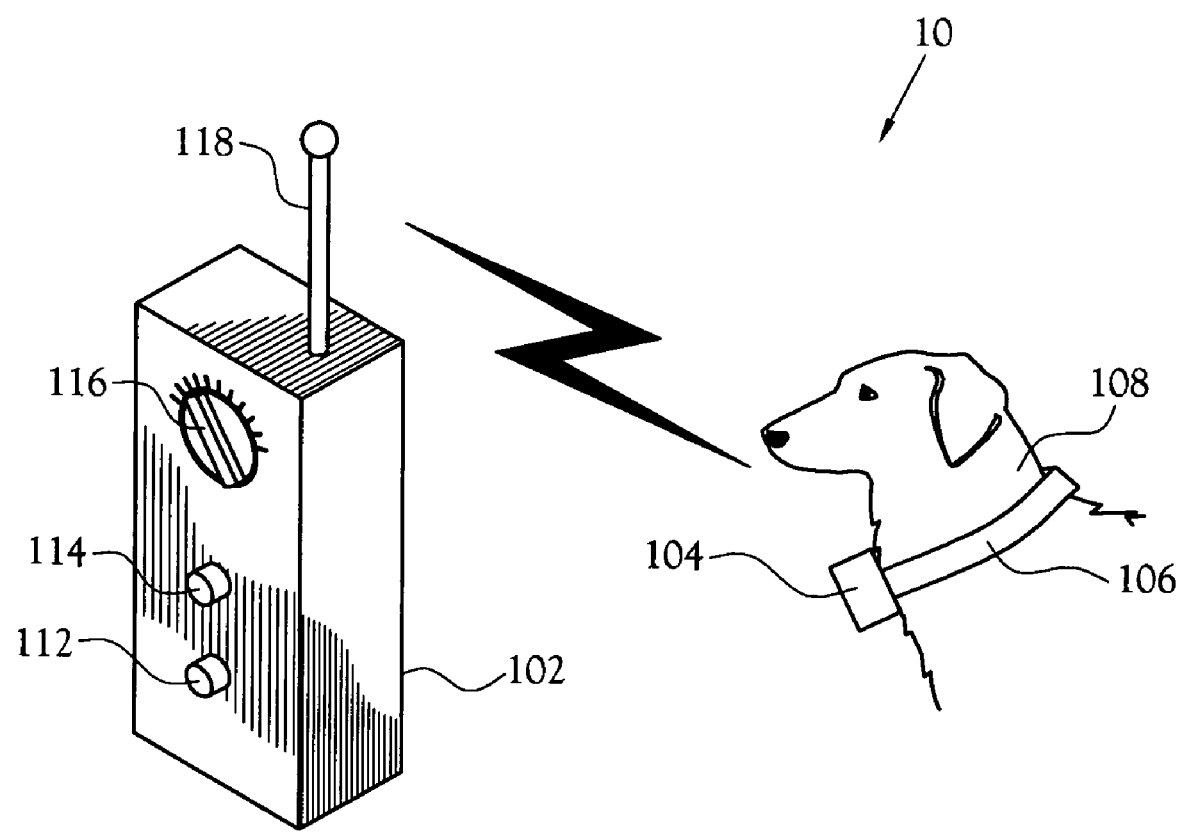
FIG. 1 is a pictorial view of a transmitter unit and a receiver unit worn by an animal.

FIG. 1 illustrates the animal training device 10, which includes a transmitter unit 102 and a receiver unit 104 attached to a collar 106 worn by an animal 108. The transmitter unit 102 includes an antenna 118. Those skilled in the art will recognize that the antenna 118 can be an external antenna as shown in FIG. 1 or an antenna internal to the housing of the transmitter unit 102 without departing from the spirit and scope of the present invention. The transmitter unit 102 includes a pushbutton switch 112 for producing a tone at the receiver unit 104. The transmitter unit 102 also includes a pushbutton switch 114 for producing a corrective stimulation at the receiver unit 104. The transmitter unit 102 also includes a selector switch, or a stimulation level switch, 116 for selecting the level of correction. Those skilled in the art will recognize that the stimulation level switch 116 can be a rotary switch or other type of selector switch without departing from the spirit and scope of the present invention.

The receiver unit 104 is attached to a collar 106 that is worn about the neck of an animal 108. Those skilled in the art will recognize that the collar 106 can be worn about other parts of the animal's body without departing from the spirit and scope of the present invention.

FIG. 2 illustrates a block diagram of the transmitter unit 102. The tone switch 112, the correction switch 114, and the stimulation level switch 116 provide inputs to a processor 202. The processor 202 produces a signal that is sent through the transmitter 204 to the antenna 118.

In one embodiment, pressing either the tone switch 112 or the correction switch 114 initiates the generation of a 14 bit data stream by the processor 202. The data stream generated by the processor 202 is sent to the transmitter 204 and, ultimately, the receiver unit 104. The 14 bit data stream includes 8 bits for an identification code, 1 bit to identify that data stream is a test or identification code, 1 bit to identify the stimulation type, that is, whether the stimulation is a beep (tone) or a shock (correction), and 4 bits for the stimulation level. The transmitter unit 102 is matched to the receiver unit 104 through the use of the identification code. Unless the identification code sent by the transmitter unit 102 matches the identification code stored in the receiver unit 104, the receiver unit 104 will not respond. The tenth bit, which identifies whether the stimulation is a tone or correction, is based on which switch, the tone switch 112 or the correction switch 114, is actuated. The final 4 bits are derived from the position of the stimulation level switch 116. In one embodiment, the stimulation level switch 116 is a 10-position rotary switch, with each position representing a different level of corrective stimulation. Those skilled in the art will recognize that the stimulation level switch 116 can have as many positions as stimulation levels desired without departing from the spirit and scope of the present invention.

FIG. 3 illustrates a block diagram of the receiver unit 104. A receiving antenna 302 is connected to a receiver 304, which detects the signal from the transmitting unit 102 and outputs the 14 bit data stream as the received coded signal 322. The receiver 304 is connected to a processor 306, which acts upon the data stream. The processor 306 is connected to a switch 308, which controls the transformer 310 connected to the electrodes 312. The processor 306 is also connected to a speaker 314, which provides a tone to the animal. The 14 bit data stream is detected by the receiver 304 and is passed to the processor 306 as a received signal 322. The processor decodes the received signal, or data stream, 322 and controls the switch 308 and the speaker 314, as appropriate. In one embodiment, the speaker, or sound generating device, 314 includes an amplifier connected to a speaker or other sound producing device. The received signal 322 represents a request message from the transmitter unit 102, and the request message contains, in one embodiment, an identification code, a stimulation type code, and a stimulation level.

In another embodiment, the received signal, or request message, 322 contains a test code that flags that the request message 322 is a test signal, in which case the processor 306 executes software that performs test functions.

Figure 4:
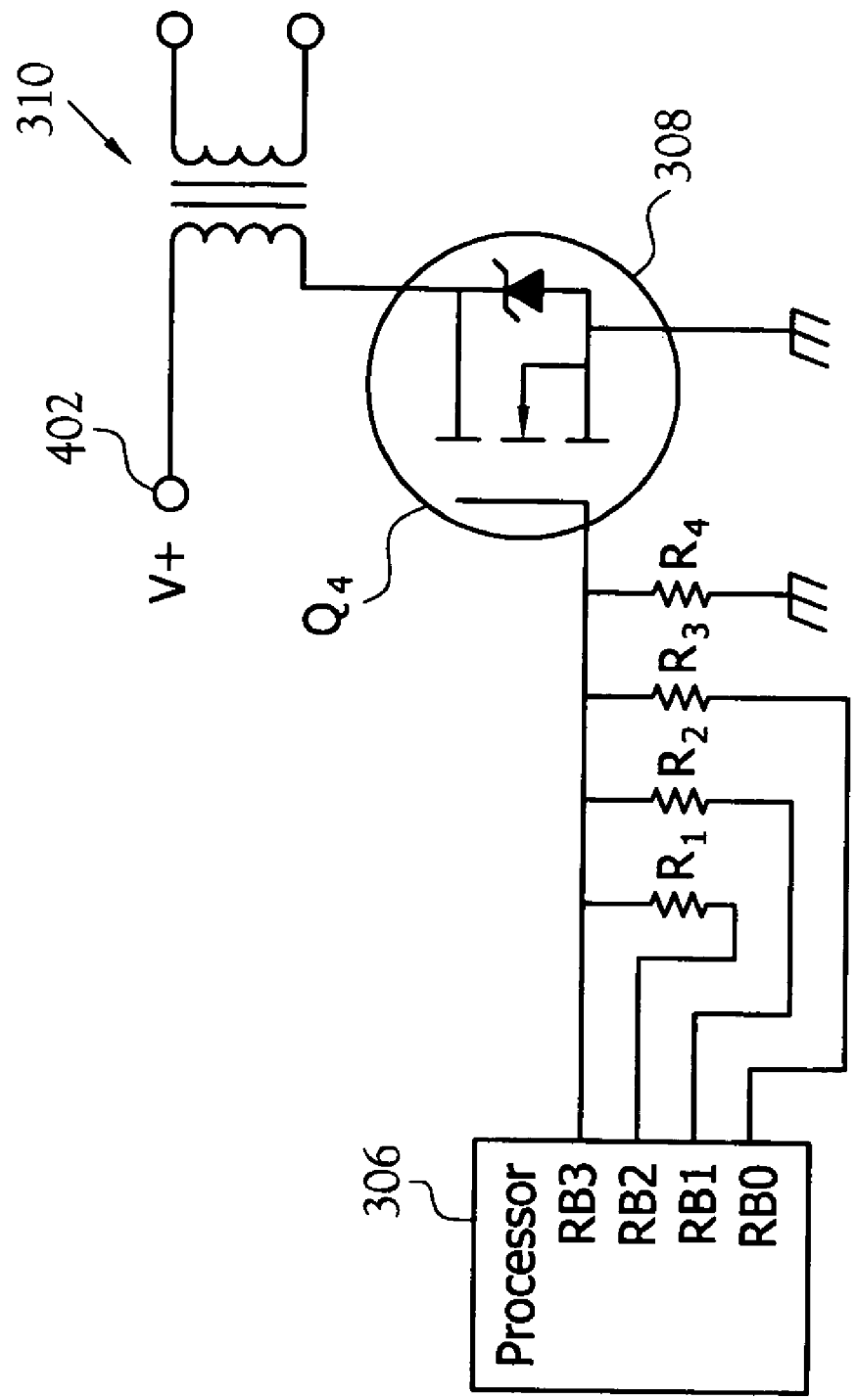
FIG. 4 is a partial schematic diagram showing one embodiment of a portion of the receiver unit.

FIG. 4 is a schematic diagram of a portion of the receiver unit 104 showing only the relationship of the connections between the processor 306, the switch 308, and the transformer 310. The processor 306 has four output connections RB0, RB1, RB2, RB3 connected to the gate of single N-channel HEXFET power MOSFET Q4, which is the switch 308 illustrated in FIG. 3. The drain of the MOSFET Q4 is connected to the primary of the transformer 310. The other end of the primary of the transformer 310 is connected to the power supply V+.

In one embodiment, the processor 306 is a Microchip part number PIC16F627, which is a CMOS FLASH-based 8-bit microcontroller. In one embodiment, the switch 308 is an International Rectifier part number IRLL110 or IRLD110 single N-channel HEXFET power MOSFET Q4. Those skilled in the art will recognize that other processors and switches can be used without departing from the scope and spirit of the present invention.

The output connections RB0, RB1, RB2, RB3 of the controller 306 are bi-directional input/output (I/O) ports that can be programmed for internal weak pull-up. The output connections RB0, RB1, RB2, RB3 are controlled to be in one of three states: ground; Vdd, which is the positive power supply voltage; or a high impedance, which is the same as an open circuit.

The four output connections RB0, RB1, RB2, RB3, in combination with voltage divider resistors R1, R2, R3, R4, control the voltage applied to the gate of the MOSFET Q4. For example, driving output RB3 to ground and the other outputs RB0, RB1, RB2 to a high impedance or ground state causes the gate of the MOSFET Q4 to be at the lowest possible voltage, ground, corresponding to a no stimulation level. Driving output RB3 to Vdd and the other outputs RB0, RB1, RB2 to a high impedance causes the gate of the MOSFET Q4 to be at the highest possible voltage, corresponding to a high stimulation level. The gate voltage is set between these two extremes by setting the state of the outputs RB0, RB1, RB2, RB3 such that the resistors R1, R2, R3, R4 provide a voltage divider.

Figure 5:
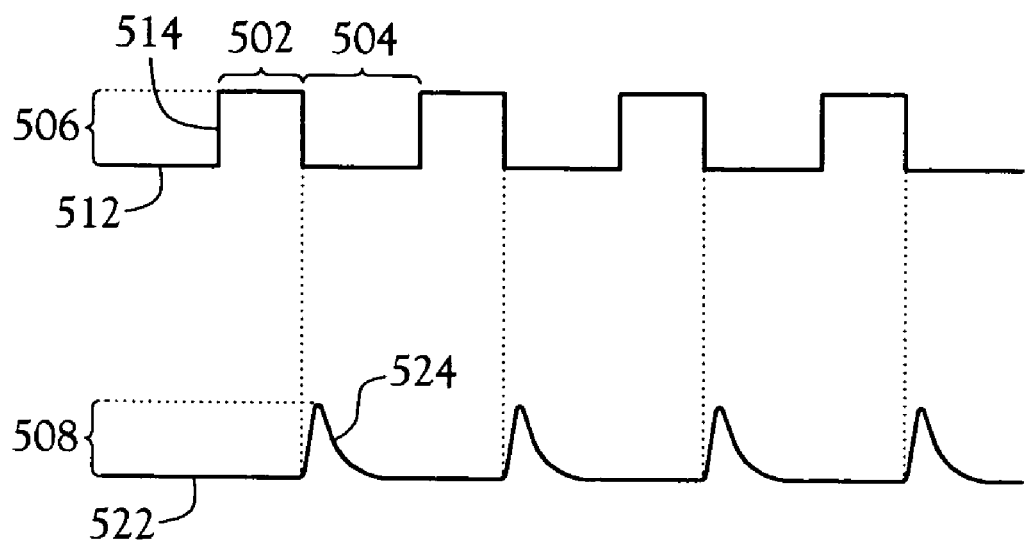
FIG. 5 is timing diagram for a low stimulation level.
Figure 6:
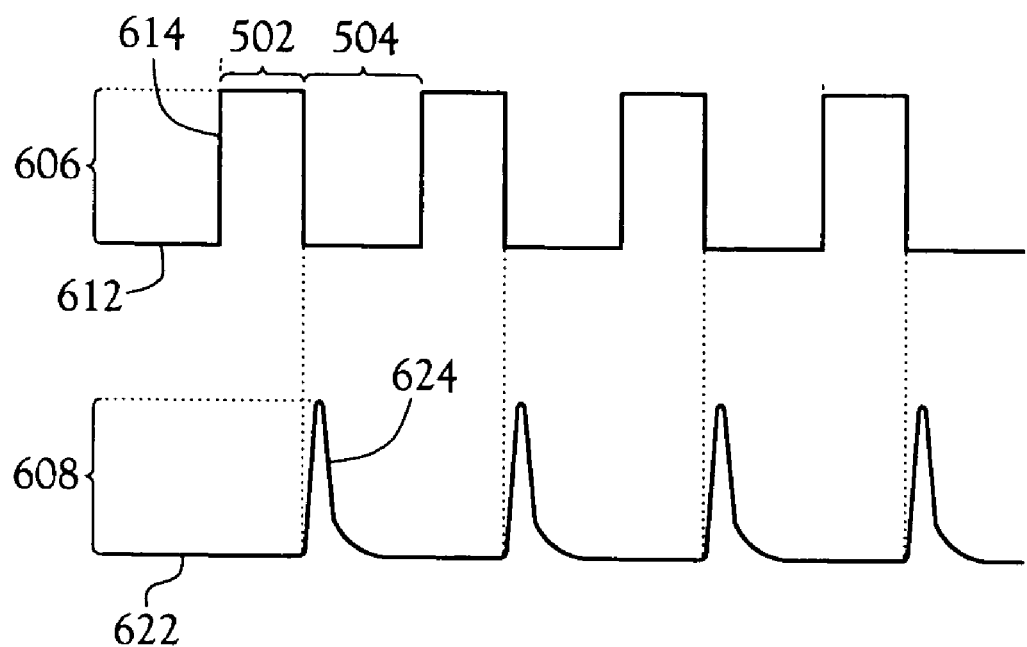
FIG. 6 is a timing diagram for a high stimulation level.

FIGS. 5 and 6 are timing diagrams illustrating the waveforms and their timing for the stimulation signals. The processor 306 produces, via the outputs RB0, RB1, RB2, RB3, output signals that pass through the voltage divider network R1, R2, R3, R4 resulting in an input pulse stream 512, 612 that is input to the gate of the MOSFET Q4. The input pulse stream 512, 612 has a fixed pulse width 502, a fixed pulse frequency (illustrated by the pulse width 502 and the separation 504 between pulses 512, 612), and a variable amplitude, or voltage level, 506, 606. The input pulse stream 512, 612 is acted upon by the switch 308 and transformer 310 to produce an output pulse stream 522, 622 having a fixed period 502 plus 504 or frequency. The amplitude, or voltage level, 508, 608 of the output pulse stream 522, 622 varies in relation to the selected stimulation level.

With respect to FIG. 5, input signal 512 is the waveform for a low stimulation level signal entering the gate of MOSFET Q4 and output signal 522 is the waveform of the signal at the output of the transformer 310 corresponding to the input signal 512. The input signal 512 is a square wave signal with pulses 514 that have a voltage level 506, a width 502, and a period 504 between pulses. The secondary of the transformer 310 produces, or generates, an output signal 522, which is a pulse stream that corresponds to the input signal 512. When the input signal 512 transitions from the pulse 514 to the period 504 between pulses, an output pulse 524 is generated, and the output pulse 524 has a voltage level 508 corresponding to the voltage level 506 of the input signal 512.

With respect to FIG. 6, input signal 612 is the waveform for a high stimulation level signal entering the gate of MOSFET Q4 and output signal 622 is the waveform of the signal at the output of the transformer 310 corresponding to the input signal 612. The output signal 622 voltage level 608 corresponds to the input signal 612 voltage level 606. Accordingly, as illustrated in FIGS. 5 and 6, the output signal 522, 622 voltage level 508, 608 is directly related to the input signal 512, 612 voltage level 506, 606.

The input signal 512, 612 voltage level 506, 606 is controlled by the processor 306 and the resistors R1, R2, R3, R4, which form a voltage divider network based on the level of the processor 306 outputs RB0, RB1, RB2, RB3. The processor 306 includes software and routines for decoding the signal 322 received from the transmitting unit 102. Included in the coded signal 322 is a stimulation level code, which is used by the processor 306 to determine the setting of the outputs RB0, RB1, RB2, RB3. The outputs RB0, RB1, RB2, RB3 are controlled by the processor 306 to produce the input signal 512, 612 by alternating the state of the outputs RB0, RB1, RB2, RB3 between the pulse 514, 614 on and off states, with the on state being held for a period equal to the pulse width time 502 and the off state being held for a period equal to the period 504 between pulses 514, 614.

Figure 7:
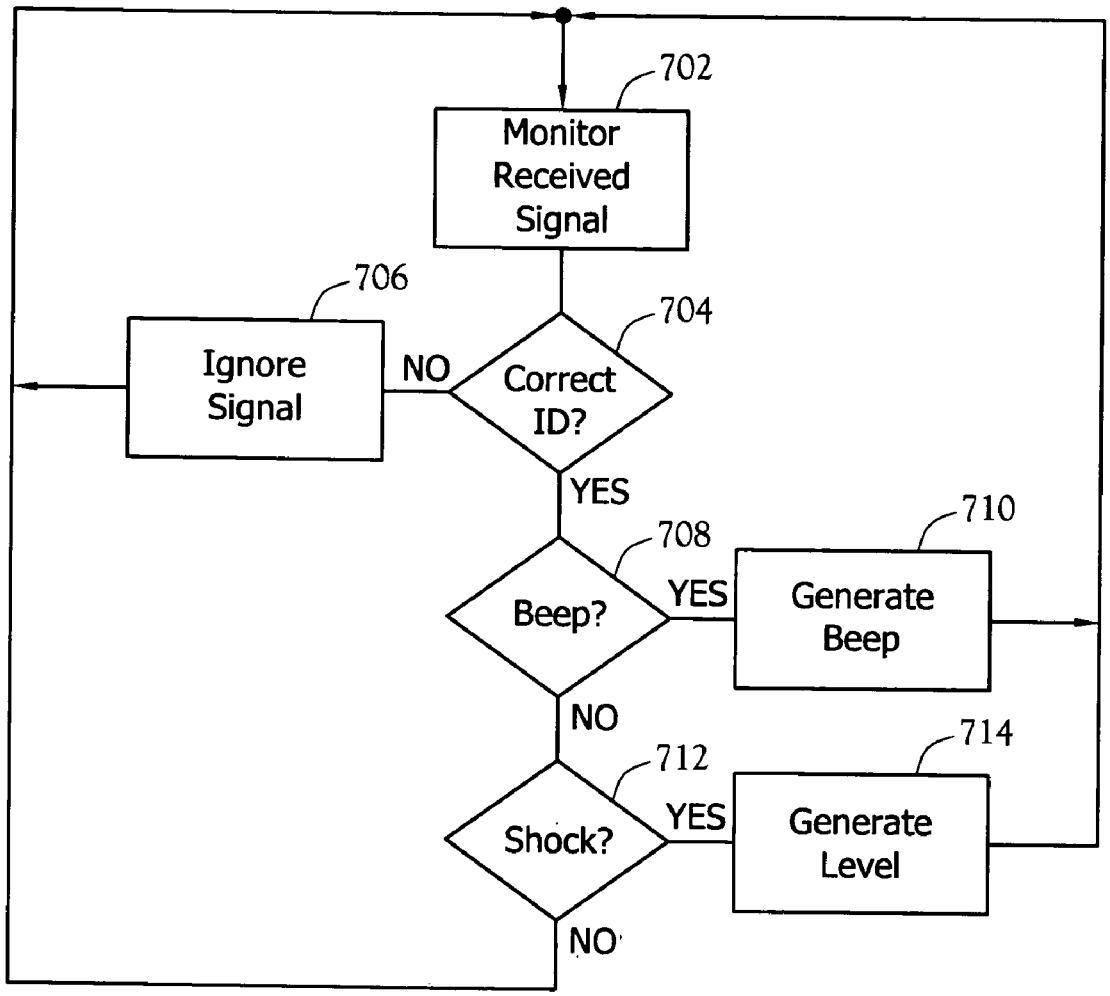
FIG. 7 is a flow diagram of one embodiment of the processor functions.

FIG. 7 illustrates the various functions performed by one embodiment of the processor 306. The signals 322 from the receiver 304 are monitored 702. When a signal 322 is received, the signal 322 is checked to verify whether it contains a correct identification (ID) code 704. If the ID code matches that stored in the processor 306, the monitored signal 322 is then checked to see if the stimulation is a beep 708. If the ID code does not match, the signal 322 is ignored 706 and the processor 306 monitors the output of the receiver 304 for another signal 322. If the signal 322 indicates that a beep is desired, the processor 306 generates a beep 710, which operates the speaker 314. Generating the beep 710 is accomplished by generating a control signal that is routed to an output of the processor 306 that is connected to a sound generating device 314.

If a beep is not desired, the monitored signal 322 is then checked to see if the stimulation is a shock 712. If the signal 322 does not indicate a shock is desired, the processor 306 loops back to monitor the output of the receiver 306. If a shock is desired, the signal 322 is decoded to generate the stimulation level 714. The processor 306 then generates stimulation level 714 by generating a control signal that is applied to the output connections RB0, RB1, RB2, RB3 of the controller 306, which are connected to the gate of the MOSFET Q4, either directly or through voltage divider resistors R1, R2, R3. The processor 306 controls the length of time the control signal is applied to the gate of the MOSFET Q4 (the pulse width 502) and the length of time between pulses 504.

The length of the signal 322, which determines the stimulation period, is controlled by the operator operating the correction switch 114 and the processor 306. In one embodiment, the processor 306 includes a routine for limiting the duration of the signal 322. In one embodiment, this duration is a maximum of 8 seconds for all stimulation levels. In another embodiment, the operator can select a shorter stimulation period, or length of the signal 322, by releasing the correction switch 114 before the maximum duration time has been reached. For example, if the operator desires a one second stimulation, the operator depresses the correction switch 114 for a one second period and then releases the switch 114, which terminates the signal 322.

The processor 306, in other embodiments, includes a routine for performing the function of verifying the validity of the received signal 322. As described above, the transmitter unit 102 generates a 14 bit data stream. In one embodiment, the processor 306 verifies that the received signal 322 contains exactly 14 bits of data.

In one embodiment, each of the functions identified in FIG. 7 are performed by one or more software routines run by the processor 306. In another embodiment, one or more of the functions identified in FIG. 7 are performed by hardware and the remainder of the functions are performed by one or more software routines run by the processor 306.

The processor 306 includes a memory medium that stores software, or routines, that the processor 306 executes. These routines can be discrete units of code or interrelated among themselves. Those skilled in the art will recognize that the various functions can be implemented as individual routines, or code snippets, or in various groupings without departing from the spirit and scope of the present invention. As used herein, software and routines are synonymous. However, in general, a routine refers to code that performs a specified function, whereas software is a more general term that may include more than one routine or perform more than one function.

As used herein, the processor 306 should be broadly construed to mean any computer or component thereof that executes software. The processor 306 includes a memory medium that stores software, a processing unit that executes the software, and input/output (I/O) units for communicating with external devices. Those skilled in the art will recognize that the memory medium associated with the processor 306 can be either internal or external to the processing unit of the processor without departing from the scope and spirit of the present invention.

The function of receiving the coded signal 322 is performed by the receiver 304. The function of decoding the coded signal 322 is performed by the processor 306. The function of producing the electrical stimulation is performed, in one embodiment, by the processor 306 outputting a pulse stream 512, 612 to a voltage divider to a switch 308, which is connected to the pulse transformer 310. The voltage produced through the voltage divider is related to the requested stimulation level. The function of producing a beep is performed by the processor 306 and the speaker 314.

From the foregoing description, it will be recognized by those skilled in the art that an apparatus for an animal training device is provided. The apparatus uses an internal voltage level to control the voltage of the electrical stimulation applied to an animal for training. Also, the apparatus uses a processor to decode the signal from the transmitting unit and to control the stimulation type and level.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

We claim:

1. In an apparatus for training an animal in which audible and variable level electrical stimulation is applied to the animal, a memory medium comprising software programmed to provide for controlling the stimulation applied to the animal by a process comprising:
   a) receiving an electronic signal representing a request message to stimulate the animal, said request message including an identification code and a stimulation level code;
   b) determining whether an electrical stimulation is to be generated to stimulate the animal;
   c) generating a first control signal corresponding to said stimulation level code; and
   d) outputting said control signal to produce a signal having a voltage corresponding to said stimulation level code.

2. The memory medium of claim 1 wherein the process further includes verifying said coded signal from said identification code.

3. The memory medium of claim 1 wherein the process further includes:
   e) determining whether a beep is to be generated to stimulate the animal; and
   f) generating a second control signal for operating a sound generating device.

4. A memory medium in an apparatus for training an animal, said memory medium tangibly embodying a program of executable instructions to perform method steps for controlling the intensity of a stimulation applied to an animal, said method comprising the steps of:
   (a) receiving an request signal containing at least a stimulation level code;
   (b) interpreting said stimulation level code;
   (c) setting a state for each of a set of outputs determined by said stimulation level code; and
   (d) generating an stimulation control signal based on said state for each of said set of outputs, said stimulation control signal having a voltage corresponding to a voltage of the stimulation to be applied to the animal.

5. The memory medium of claim 4 wherein each said state in step of setting a state for each of said set of outputs from the method of the program of executable instructions embodied therein is selected from the group of states consisting of a ground state, a positive voltage state, and a high impedance state.

6. The memory medium of claim 4 wherein said stimulation control signal voltage from the method of the program of executable instructions embodied therein corresponds to said stimulation level code.

* * * * *